United States Patent [19]

Olry et al.

[11] Patent Number: 5,392,500
[45] Date of Patent: * Feb. 28, 1995

[54] PROCESS FOR THE MANUFACTURE OF A FIBROUS PREFORM FORMED OF REFRACTORY FIBERS FOR PRODUCING A COMPOSITE MATERIAL ARTICLE

[75] Inventors: Pierre Olry, Bordeaux; Dominique Coupe, Le Haillan; Philippe DuPont, Le Bouscat, all of France

[73] Assignee: Societe Europeenne de Propulsion, Suresnes, France

[*] Notice: The portion of the term of this patent subsequent to Jul. 20, 2010 has been disclaimed.

[21] Appl. No.: 13,764

[22] Filed: Feb. 4, 1993

Related U.S. Application Data

[63] Continuation-in-part of Ser. No. 801,700, Dec. 2, 1991, Pat. No. 5,228,175.

[30] Foreign Application Priority Data

Feb. 5, 1992 [FR] France ................... 92 01300

[51] Int. Cl.⁶ .............................................. D06H 7/22
[52] U.S. Cl. ............................. 28/168; 28/170; 28/112
[58] Field of Search ................ 28/107, 112, 165, 168, 28/170, 109, 166, 167, 169; 156/148, 149, 155; 428/370; 57/7, 295; 19/0.35; 87/1, 5; 139/426 R

[56] References Cited

U.S. PATENT DOCUMENTS

| 3,994,762 | 11/1976 | Wrzesien et al. ................ 156/148 |
| 4,482,601 | 11/1984 | Hartigan, Jr. .................... 428/234 |
| 4,790,052 | 12/1988 | Olry ............................... 28/110 |
| 4,825,635 | 5/1989 | Guevel et al. ................... 57/315 |
| 4,885,973 | 12/1989 | Spain .............................. 87/1 |

FOREIGN PATENT DOCUMENTS

| 0424988 | 5/1991 | European Pat. Off. . |
| 2414574 | 8/1979 | France . |
| 2581379 | 11/1986 | France . |
| 2608641 | 6/1988 | France . |
| 2626294 | 7/1989 | France . |
| 7316144 | 5/1973 | Japan . |
| 2210036 | 8/1990 | Japan . |
| 1447030 | 8/1976 | United Kingdom . |
| 2021660 | 12/1979 | United Kingdom . |

OTHER PUBLICATIONS

Japanese Patents Gazette Section Ch. Week 8329, 11 Jun. 1983 Derwent Publications Limited, London.

Primary Examiner—Clifford D. Crowder
Assistant Examiner—Amy B. Vanatta
Attorney, Agent, or Firm—Weingarten, Schurgin, Gagnebin & Hayes

[57] ABSTRACT

A process for the manufacture of a fibrous texture for producing a composite material article. The fibrous texture is formed of a yarn comprising discontinuous fibers which are made of a refractory material or a precursor thereof. The discontinuous fibers are disposed parallel to one another, without twist. A covering yarn made of a fugitive material is disposed over the discontinuous fibers to provide integrity to the yarn. The covering yarn is eliminated after formation of the fibrous texture.

33 Claims, No Drawings

PROCESS FOR THE MANUFACTURE OF A FIBROUS PREFORM FORMED OF REFRACTORY FIBERS FOR PRODUCING A COMPOSITE MATERIAL ARTICLE

RELATED APPLICATION

This application is a continuation-in-part application of U.S. patent application Ser. No. 07/801,700, of Dec. 2, 1991, now U.S. Pat. No. 5,228,175.

FIELD OF THE INVENTION

The invention relates to the manufacture of fibrous preforms formed of refractory fibers for producing composite material articles.

Refractory fibers are understood to encompass carbon fibers and ceramic fibers. Among the latter are carbide, nitride or refractory-oxide fibers, such as those made of silicon carbide or silicon nitride, or boron carbide, alumina, etc.

Precursors of refractory fibers are understood to mean fibers in a state prior to a refractory state, the transition to the latter state usually being obtained by heat treatment. For example, a precursor of carbon would be pre-oxidized polyacrylonitrile (PAN), or pitch, while a precursor of silicon carbide would be polycarbosilane (PCS).

One particular application of the present invention is in the manufacture of articles made of composite materials composed of a refractory fibrous preform that is densified by a matrix., the densification consisting in the deposition or infiltration of a matrix material into the porosity of the preform throughout the volume thereof. Amongst such materials, the invention is applicable, for example, to making thermostructural composites capable of retaining their mechanical properties at high temperatures by virtue of an appropriate selection of matrix and of reinforcing fibers. Conventional thermostructural composite materials are carbon-carbon (C/C) and ceramic matrix composites (CMC), in particular composites having a matrix of silicon carbide (SIC), with reinforcing fibers of carbon (C/SiC composite) or with reinforcing fibers of silicon carbide (SiC/SiC composite).

BACKGROUND OF THE INVENTION

In the manufacture of composite material articles, the fibrous preform must be prepared in such a manner as to confer the desired mechanical properties on the articles.

The fibrous preform is generally obtained from one-dimensional elements, such as yarns or cables, or two-dimensional textures such as cloth, felt, . . . .

Yarns or cables are wound to form axially-symmetrical wound preforms or they are laid parallel to one another in one-directional sheets. The sheets are superposed while ensuring that the directions of the yarns or cables in two adjacent sheets are different.

Cloth or felt is rolled up onto itself or is cut out into plies that are superposed so as to build up the desired thickness for the preform.

In order to improve the mechanical properties of composite materials in which the preform is made up of plies or sheets that are rolled up or superposed, proposals have been made to bond the plies or sheets together by means of yarns or fibers extending transversely thereto. This can avoid the phenomenon of delamination, i.e. of the material splitting between sheets or plies.

Needling is a technique for bonding together plies or sheets that is known and relatively easy to implement.

One difficulty encountered with known refractory fibers resides in their poor ability to undergo textile forming operation, such as weaving, notably in the case of ceramic fibers, and especially as regards needling.

A known way of overcoming this difficulty consists in conducting all the necessary textile-forming operations on yarns whose constituent fibers are in the precursor state, where they are more apt to undergo these operations. The transformation of the precursor into a refractory material is then performed after carrying the textile operations.

Another known way of overcoming this difficulty, when needling superposed plies of a carbon fiber cloth, or superposed unidirectional sheets made of carbon fibers, consists in interposing layers of felt between the plies or sheets. When using a cloth or a sheet formed from yarns in which the cohesion of the fibers is ensured by twisting, the penetration of the yarns by the needling action has more the effect of breaking the fibers than detaching the fibers to allow implantation across the plies. Accordingly, the interposed felt layers are provided to serve as a source of fibers capable of being drawn along by the needling action.

A further problem encountered in the manufacture of composite material articles concerns the accessibility of the internal pores of the fibrous preform during densification.

Different densification techniques are known, such as resin densification and chemical vapor deposition or infiltration.

Resin densification consists in impregnating the preform with a liquid containing a precursor of the material forming the matrix and then transforming the precursor, usually through a heat treatment. Usually the precursor is a polymer which is cured and pyrolysed to obtain the matrix material. The process including impregnation, curing and pyrolysis may be carried out several times.

Chemical vapor deposition or infiltration involves placing the preform in an enclosure into which a gaseous flow is introduced under predetermined temperature and pressure conditions. The gaseous flow thus forms the matrix material upon contact with the fibers of the preform, though a decomposition of one or several its constituents, or by a reaction between its constituents.

Whatever the technique used, it is impossible in practice to achieve a complete densification of the preform. The reason is that some of the volumes that the yarns define between themselves include "dead" volumes. These "dead" volumes cannot be densified, even if a chemical vapor infiltration process is used, their restricted access, if at all present, becoming rapidly obstructed.

OBJECTS AND SUMMARY OF THE INVENTION

It is an object of the present invention to provide a process for the manufacture of a fibrous preform made of refractory fibers which may include the carrying out of different types of textile operations.

It is more particularly an object of the present invention to provide a method adapted to making fibrous preforms by needling superposed plies or sheets, with the destructive effect of needling on the integrity of the constituents of the textures being minimized.

It also an object of the invention to provide a method enabling fibrous preforms to be prepared that are equally suitable for making composite material articles that are relatively thin or for making composite material articles that are thicker.

Yet another object of the present invention is to provide a process for the manufacture of fibrous preforms having practically no "dead" volumes and therefore capable of being easily densified.

These and further objects are achieved by means of a process comprising providing a fibrous texture by carrying out the steps of:

providing a yarn comprising discontinuous fibers made of a refractory material or a precursor thereof, with the discontinuous fibers being disposed parallel to one another, without twist, and a covering yarn made of a fugitive material over the discontinuous fibers to achieve yarn's integrity, forming a fibrous texture from said yarn composed of parallel discontinuous fibers and a covering yarn, and eliminating said covering yarn.

Preferably, the covering yarn has a low denier compared with that of the assembly of discontinuous fibers in order not to leave too important voids within the texture after elimination of the covering yarn. The denier of the covering yarn is preferably less than one tenth of that of the assembly of discontinuous fibers.

The covering yarn is made of a fugitive material which is to be understood as encompassing any material capable of being eliminated without leaving any residue, and without causing an alteration of the refractory fibers. For instance, the fugitive material can be a soluble polymer, such as PVA (polyvinyl alcohol), or a polymer capable of being totally eliminated by a heat treatment, such as polyvinyl acetate or polyethylene.

The step of providing a yarn in the process according to the invention involves obtaining discontinuous fibers, preferably long discontinuous fibers, that are parallel to one another and made of a refractory material or a precursor thereof. Such a step may be achieved e.g. by controlled stretch-breaking of a multifilament tow cable, as described in French Patent Application No 2,608,641, whereby fibers having an average length of between 100 and 120 mm (about 4 to 5 inches) can be obtained.

In the aforementioned document, the fibers are transformed into a yarn by a twist carried out on a standard spinning apparatus.

In contrast, the fibers that make up the yarn used in the present invention are left parallel to each other, and not twisted, the integrity of the yarn being achieved by covering the fibers with a covering yarn. This covering can be obtained by means of a known yarn covering machine, such as the "Parafil" machine produced by Spindelfabrik Suessen of Germany.

The covering of the yarn provides the necessary resistance in view of the textile operations, and weaving in particular.

After elimination of the covering yarn, the presence of discontinuous parallel fibers in an untwisted state allows the needling to be conducted by taking some of these fibers with the needles, without relying on a felt-like texture to provide the fibers susceptible of being drawn along by the needles, and without the same destructive effect as when needling is performed on yarns made of twisted fibers.

The process according to the invention has the added advantage of making it possible to eliminate the "dead" volumes that are not completely densifiable. Indeed, once the fibrous texture has been made and the covering yarn eliminated, the loosened fibers have a tendency to occupy the available volumes as a result of a "swelling" of the yarn. This enables the porosity of the texture to be more easily and more uniformly accessible to the matrix material. This results in a more complete densification and a reduced inhomogeneity of the composite material.

When the yarn used for producing the fibrous texture is made of a precursor of the intended refractory material, the transformation of the precursor into a refractory material is conducted after the texture is produced and after elimination of the covering yarn. When the covering yarn is made of a material capable of being eliminated by heat, the elimination can be obtained during a raising in temperature carried out in view of transforming the precursor by a heat treatment.

DETAILED DESCRIPTION OF PREFERRED EMBODIMENTS

Various examples showing the manufacturing of a fibrous preform according to the invention are described hereinbelow, purely as a non-limiting indication.

In all examples, a fibrous texture is obtained from a yarn comprising discontinuous fibers made of a material selected from carbon, ceramics and precursors thereof. The discontinuous fibers are disposed parallel to one another, without twist, and a covering yarn made of a fugitive material is provided on the fibers to secure integrity of the yarn.

The fibrous texture may be formed by weaving yarns composed of parallel discontinuous fibers and a covering yarn. Elimination of the covering yarn is carried out thereafter, thus allowing the discontinuous fibers to loosen within the bulk of the fibrous texture. A plurality of layers or plies of two-dimensional woven fibrous textures may be superposed and needled to obtain a preform of a composite material article.

The fibrous texture may also be formed by superposing and needling together a plurality of one-directional sheets consisting of parallely extending yarns composed of parallel discontinuous fibers and a covering yarn. The sheets are superposed with pairs of adjacent sheets having different directions.

As already mentioned, since the yarns constituting the needled plies or sheets are formed by an assembly of discontinuous fibers, without twisting, needling does not have the same destructive effect as it does when performed on yarns made of twisted fibers. Indeed, needling may cause twisted yarns to break, thereby reducing the mechanical properties of the fibrous texture and consequently the mechanical properties of the resulting composite material article. Thus, the process according to the invention is suitable to manufacture fibrous textures for making preforms for thin composite material articles, such as articles in the form of a rigid foil or web having good mechanical properties.

In particular, a fibrous preform for a composite material article may be made by directly needling together a plurality of one-directional sheets that are superposed in different directions, with needling being performed at an adequate density per unit area, e.g. in the range 20 punches/cm$^2$ to 300/cm$^2$, so as to impart the necessary cohesion between sheets. Articles made of a composite material such as C/C, C/SiC or SiC/SiC thermostructural composite material, having a tensile strength greater than 250 MPa, and an interlaminar shear strength (parallel to the sheets) greater than 30 MPa can thus be obtained from fibrous preforms having a thickness that may be less than 15 mm.

For parts made of thicker composite material, a plurality of sheets are superposed in different directions and are pre-needled to form a basic fabric. The basic fabric is then used to make a fibrous preform for a composite material article. Prior to pre-needling, cohesion between the superposed sheets may be provided by means of a binding yarn. This yarn is identical to the yarns constituting the sheets or else it is made of a fugitive material suitable for being eliminated, e.g. by means of a solvent or by heat treatment, without leaving solid residue. The pre-needling is performed lightly, e.g. at a density per unit area lying in the range 5 punches/cm$^2$ to 40 punches/cm$^2$, i.e. just enough to enable the basic fabric to be handled. A fibrous preform may be made by superposing and needling together plies of the pre-needled basic fabric, or by winding up and needling together a strip of the pre-needled basic fabric. The superposed turns or plies of the basic fabric are needled together in the manner described in U.S. Pat. No. 4,790,052, for example.

EXAMPLE 1

Manufacture of a fibrous preform made of carbon fibers.

A two-dimensional (2D) fibrous texture is formed by weaving a yarn made of non-twisted and discontinuous pre-oxidized PAN (polyacrylonitrile) fibers covered with a PVA (poly vinyl alcohol) yarn. The characteristics of the 2D cloth are as follows:

| | |
|---|---|
| - yield of the pre-oxidized PAN yarn | 500 tex |
| - yield of the PVA covering yarn | 45 dtex |
| - weaving contexture | 8 satin |
| - count of warp directions | 10/cm |
| - count of weft directions | 10/cm |
| - weight | 1050 g/m$^2$ |

After weaving, the cloth is washed in a bath of water at 80° C. for a period of 10 mn and then dried. The PVA covering yarn is completely dissolved and the fibers forming the pre-oxidized PAN yarn expand within the cloth, allowing the latter to be needled directly, without need for a felt layer.

Several plies of the cloth are then superposed and needled to form a fibrous preform. The latter is then submitted to a thermal treatment (carbonisation) to transform the pre-oxidized PAN into carbon. A fibrous preform composed of carbon fibers is obtained. The above-described cloth makes it possible to obtain a needled preform in which the volume ratio of the carbon fibers is around 30% (percentage of the preform's apparent volume effectively occupied by the fibers).

The carbon fiber preform can then be densified by a material composing the matrix, such as carbon or ceramic, in order to produce the desired composite material article with a carbon fiber reinforcement. The densification is obtained by resin densification or by chemical vapor infiltration. The swelling of the yarns within the fibrous texture, resulting from the relaxation of the untwisted fibers after elimination of the covering yarn, prevents the formation of "dead" volumes within the preform and consequently contributes to a more complete and homogeneous densification.

A preform made of carbon fibers could also be manufactured starting directly from carbon fibers, including high strength carbon fibers.

EXAMPLE 2

Manufacture of a preform made of ceramic fibers.

A fibrous texture is formed by a multi-layer weaving of a yarn composed of untwisted silicon carbide (SIC) fibers covered with a PVA yarn. The characteristics of the cloth are as follows:

| | |
|---|---|
| - yield of the SiC yarn | 330 tex |
| - yield of the PVA covering yarn | 45 dtex |
| - weaving contexture | Interlock |
| - number of layers | 5 |
| - count of warp directions | 40/cm |
| - count of weft directions | 30/cm |
| - thickness of cloth | 3 mm |

After weaving, the texture is soaked in a bath of water at 80° C. for a period of 15 minutes and then dried. It is observed that the PVA yarn is dissolved and that the SiC fibers expand within the texture. The fiber volume ratio of in the woven texture as indicated above is around 30%.

As explained with reference to example 1, the resulting texture is particularly suitable to be subsequently densified.

A preform made of ceramic fibers, such as SiC fibers could also be manufactured starting from a SiC precursor, such as polycarbosilane (PCS), the transformation of PCS into SiC being carried out by thermal treatment prior to densification of the texture.

EXAMPLE 3

Three one-directional sheets each made of parallely extending yarns of non-twisted discontinuous fibers of preoxidized PAN are superposed in directions mutually offset by 60°. The preoxidized PAN yarns constituting the sheets have a titer of N.m.5 and they are covered by a 45 dtex yarn of polyvinyl alcohol which provides them with the requisite cohesion. The three sheets are bonded together by means of a polyvinyl alcohol yarn identical to the covering yarn. The mass per unit area of the assembly is 800 grams per square meter (g/m$^2$).

The sheets are made up and bonded together by conventional means, e.g. as described in U.S. Pat. No. 4,677,831.

The bonded-together sheets are pre-needled at a density of 35 punches/cm$^2$, and then immersed in a bath of hot water at 80° C. to dissolve the covering and bonding yarns. A basic fabric suitable for being needled directly is thus obtained.

Layers formed by the pro-needled basic fabric are successively superposed and needled to make a fibrous preform. The needling density is 50 punches/cm$^2$. After carbonization heat treatment of the preoxidized PAN, a needled preform of carbon fibers having a fiber volume ratio equal to 30% is obtained.

EXAMPLE 4

Three one-directional sheets formed of yarns made of non-twisted and discontinuous carbon fibers are superposed with the directions between the yarns of the sheets foraging angles equal to 90°, +45°, and −45° relative to the longitudinal direction of the strip. The carbon yarns constituting the sheets have a titer of N.m.5 and are covered by a 45 dtex polyvinyl alcohol yarn. The three sheets are bonded together by a yarn of non-twisted discontinuous carbon fibers having a titer of N.m.15 covered by a 45 dtex polyvinyl alcohol yarn. The mass per unit area of the assembly is 600 g/m².

After elimination of the covering yarns by immersion in a bath of hot water at 80° C. for 30 minutes, followed by drying, a carbon basic fabric is obtained made of bonded-together sheets suitable for being needled directly.

An axially-symmetrical fibrous preform is made by winding and simultaneously needling the basic fabric onto a mandrel. The needling density is 50 punches/cm². A fibrous preform of thickness 60 mm, of width 500 mm, and of inside diameter 200 mm made in this way has a fiber volume ratio of 35%.

EXAMPLE 5

The procedure is the same as in Example 4, except that the sheets are bonded together by means of a high tenacity polyethylene yarn (a yarn having good mechanical properties sold under the name "Dyneema" by the Dutch firm DSM).

After elimination of the covering yarns by immersion in a bath of hot water at 80° C. for 30 minutes, followed by drying, pre-needling is performed at a density of 35 punches/cm². The sheets are then unbonded by eliminating the polyethylene yarn by heat treatment at 300° C. A carbon basic fabric is thus obtained suitable for being needled directly.

In the above examples 1, 3, 4 and 5, the pre-needling (if any) of the basic fabric, and the needling of the fibrous texture are performed in conventional manner by means of barbed or forked needles.

It is nevertheless also possible to perform pre-needling and/or needling by means of water jets.

In addition, during manufacture of the fibrous perform, it is possible to interpose other fiber layers or strata, e.g. layers of felt, between the plies of cloth or basic fabric.

We claim:

1. A process for the manufacture of a fibrous preform formed of refractory fibers for producing a composite material article, said process comprising the steps of:
   providing a yarn comprising discontinuous fibers made of one of a refractory material or a precursor of said refractory material, said discontinuous fibers being disposed parallel to one another without twist, and a covering yarn made of a fugitive material over said discontinuous fibers to provide integrity to said yarn;
   forming a fibrous texture by weaving said yarn composed of parallel discontinuous fibers and a covering yarn; and
   eliminating said covering yarn, to allow said discontinuous fibers to loosen with the bulk of said fibrous texture.

2. The process of claim 1, wherein said covering yarn has a denier less than one tenth of that of said discontinuous fibers.

3. The process of claim 1, wherein said discontinuous fibers are obtained by a controlled stretch breaking process.

4. The process of claim 1, wherein said covering yarn is made of a soluble polymer.

5. The process of claim 1, wherein said covering yarn is made of a material capable of being eliminated by heat.

6. The process of claim 1, wherein said discontinuous fibers are made of a precursor of a refractory material, and the transformation of said precursor into said refractory material is performed after the step of eliminating said covering yarn.

7. The process of claim 1, further comprising the step of needling said fibrous texture after the step of eliminating said covering yarn.

8. A process for the manufacture of a fibrous preform formed of refractory fibers for producing a composite material article, said process comprising the steps of:
   providing a yarn comprising discontinuous fibers made of one of a refractory material or a precursor of said refractory material, said discontinuous fibers being disposed parallel to one another without twist, and a covering yarn made of a fugitive material over said discontinuous fibers to provide integrity to said yarn;
   forming a two-dimensional fibrous texture by weaving said yarn composed of parallel discontinuous fibers and said covering yarn;
   eliminating said covering yarn to allow said discontinuous fibers to loosen within the bulk of said fibrous texture; and
   superposing and needling a plurality of plies of said two-dimensional fibrous texture to obtain a preform of a composite material article.

9. The process of claim 8, wherein said covering yarn has a denier less than one tenth of that of said discontinuous fibers.

10. The process of claim 8, wherein said discontinuous fibers are obtained by a controlled stretch breaking process.

11. The process of claim 8, wherein said covering yarn is made of a soluble polymer.

12. The process of claim 8, wherein said covering yarn is made of a material capable of being eliminated by heat.

13. The process of claim 8, wherein said discontinuous fibers are made of a precursor of a refractory material, and the transformation of said precursor into said refractory material is performed after the step of eliminating said covering yarn.

14. The process of claim 8, further comprising the step of needling said fibrous texture after the step of eliminating said covering yarn.

15. A process for the manufacture of a fibrous preform formed of refractory fibers for producing a composite material article, said process comprising the steps of:
   providing a yarn comprising discontinuous fibers made of one of a refractory material or a precursor of said refractory material, said discontinuous fibers being disposed parallel to one another without twist, and a covering yarn made of a fugitive material over said discontinuous fibers to provide integrity to said yarn;
   forming one-directional sheets from said yarn composed of parallel discontinuous fibers and said covering yarn;
   superposing a plurality of said one-directional sheets so that discontinuous fibers of adjacent sheets are not parallel to each other;
   needling together said plurality of superposed one-directional sheets; and
   eliminating said covering yarn.

16. A process as claimed in claim 15, wherein a plurality of said one-directional sheets are needled together to directly obtain a preform of a composite material article having a thickness of less than 15 mm.

17. A process as claimed in claim 16, wherein the needling density per unit area lies in the range of 20 punches/cm$^2$ to 300 punches/cm$^2$.

18. The process of claim 15, wherein said covering yarn has a denier less than one tenth of that of said discontinuous fibers.

19. The process of claim 15, wherein said discontinuous fibers are obtained by a controlled stretch breaking process.

20. The process of claim 15, wherein said covering yarn is made of a soluble polymer.

21. The process of claim 15, wherein said covering yarn is made of a material capable of being eliminated by heat.

22. The process of claim 15, wherein said discontinuous fibers are made of a precursor of a refractory material, and the transformation of said precursor into said refractory material is performed after the step of eliminating said covering yarn.

23. The process of claim 15, further comprising the step of needling said fibrous texture after the step of eliminating said covering yarn.

24. A process for the manufacture of a fibrous preform formed of refractory fibers for producing a composite material article, said process comprising the steps of:

providing a yarn comprising discontinuous fibers made of one of a refractory material or a precursor of said refractory material, said discontinuous fibers being disposed parallel to one another without twist, and a covering yarn made of a fugitive material over said discontinuous fibers to provide integrity to said yarn;

forming one-directional sheets from said yarn composed of parallel discontinuous fibers and said covering yarn;

superposing a plurality of said one-directional sheets so that discontinuous fibers of adjacent sheets are not parallel to each other;

pre-needling said plurality of superposed one-directional sheets to form a basic fabric;

needling together a plurality of plies of said basic fabric to obtain a preform of a composite material article; and eliminating said covering yarn.

25. A process as claimed in claim 24, further comprising assembling said plurality of one-directional sheets by means of a bonding yarn, prior to said pre-needling step.

26. A process as claimed in claim 24, further comprising assembling said plurality of one-directional sheets by means of a bonding yarn made of a fugitive material, prior to said pre-needling step, and eliminating said covering yarn after said pre-needling step.

27. A process as claimed in claim 24, wherein the pre-needling density per unit area lies in the range of 5 punches/cm$^2$ to 40 punches/cm$^2$.

28. The process of claim 24, wherein said covering yarn has a denier less than one tenth of that of said discontinuous fibers.

29. The process of claim 24, wherein said discontinuous fibers are obtained by a controlled stretch breaking process.

30. The process of claim 24, wherein said covering yarn is made of a soluble polymer.

31. The process of claim 24, wherein said covering yarn is made of a material capable of being eliminated by heat.

32. The process of claim 24, wherein said discontinuous fibers are made of a precursor of a refractory material, and the transformation of said precursor into said refractory material is performed after the step of eliminating said covering yarn.

33. The process of claim 24, further comprising the step of needling said fibrous texture after the step of eliminating said covering yarn.

* * * * *

UNITED STATES PATENT AND TRADEMARK OFFICE
CERTIFICATE OF CORRECTION

PATENT NO. : 5,392,500
DATED : February 28, 1995
INVENTOR(S) : Pierre Olry, et al It is certified that error appears in the above-indentified patent and that said Letters Patent is hereby corrected as shown below:

Column 6, line 56, "pro-needled" should read --pre-needled--.

Column 6, line 66, "foraging angles" should read --forming angles--.

Signed and Sealed this

Thirty-first Day of October 1995

Attest:

BRUCE LEHMAN

Attesting Officer

Commissioner of Patents and Trademarks